United States Patent [19]
Kothari

[11] 4,018,975
[45] Apr. 19, 1977

[54] SUSPENSION MEANS FOR ELECTRIC FURNACE TRANSFORMER SECONDARY BUSES

[75] Inventor: Girish H. Kothari, Pittsburgh, Pa.
[73] Assignee: Pennsylvania Engineering Corporation, Pittsburgh, Pa.
[22] Filed: Mar. 21, 1975
[21] Appl. No.: 560,330
[52] U.S. Cl. .................................................. 13/12
[51] Int. Cl.² ......................................... H05B 7/10
[58] Field of Search .............. 13/9, 12, 13; 336/12, 336/68; 174/43

[56] References Cited
UNITED STATES PATENTS 3,898,707  8/1975  Trageser .................. 13/12

*Primary Examiner*—Harry Moose
*Attorney, Agent, or Firm*—Fred Wiviott

[57] ABSTRACT

An electric furnace supply transformer is inside of a room or vault where roof beams extend in cantilever fashion over a wall of the vault. Secondary buses from the transformer extend through clearance holes in the wall and engage with vertical posts that are supported on and electrically isolated from the cantilever beams. The posts have terminal members for connecting with the buses and with cables leading to the electric furnace electrodes.

22 Claims, 7 Drawing Figures

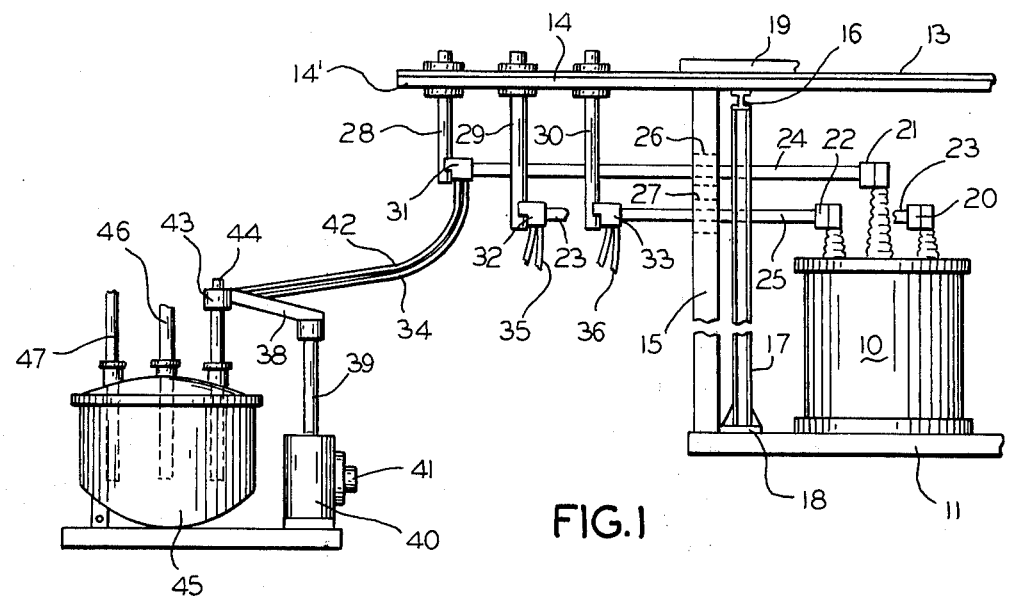
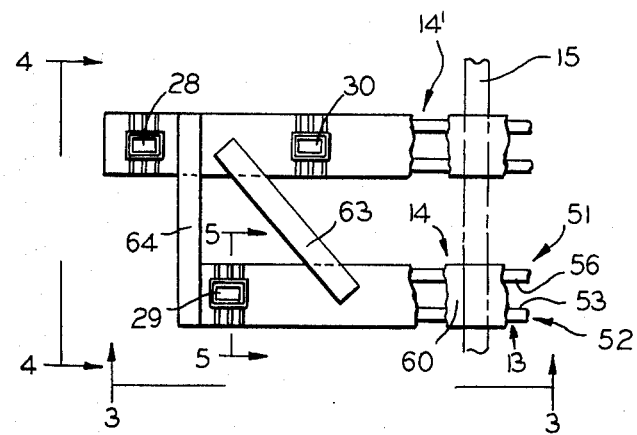
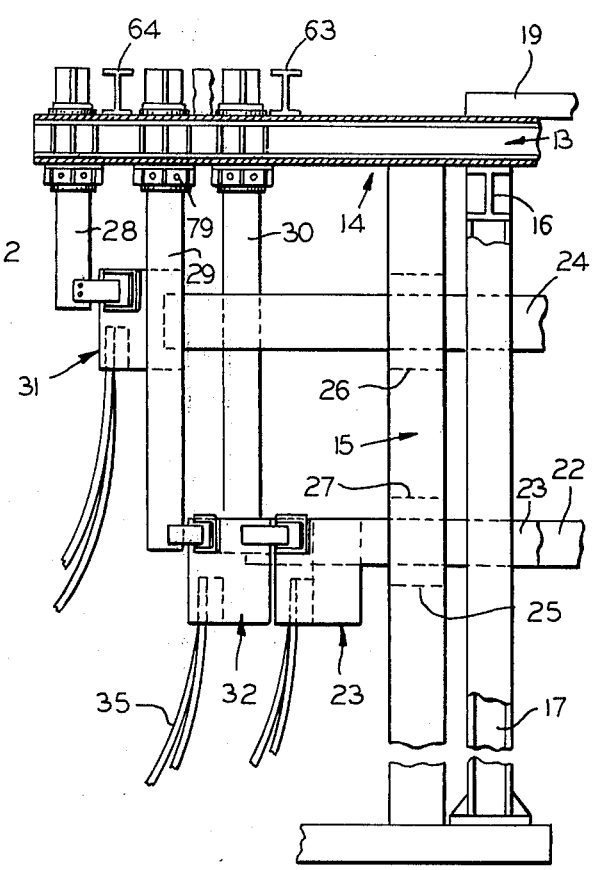
FIG.1
FIG.2
FIG.3

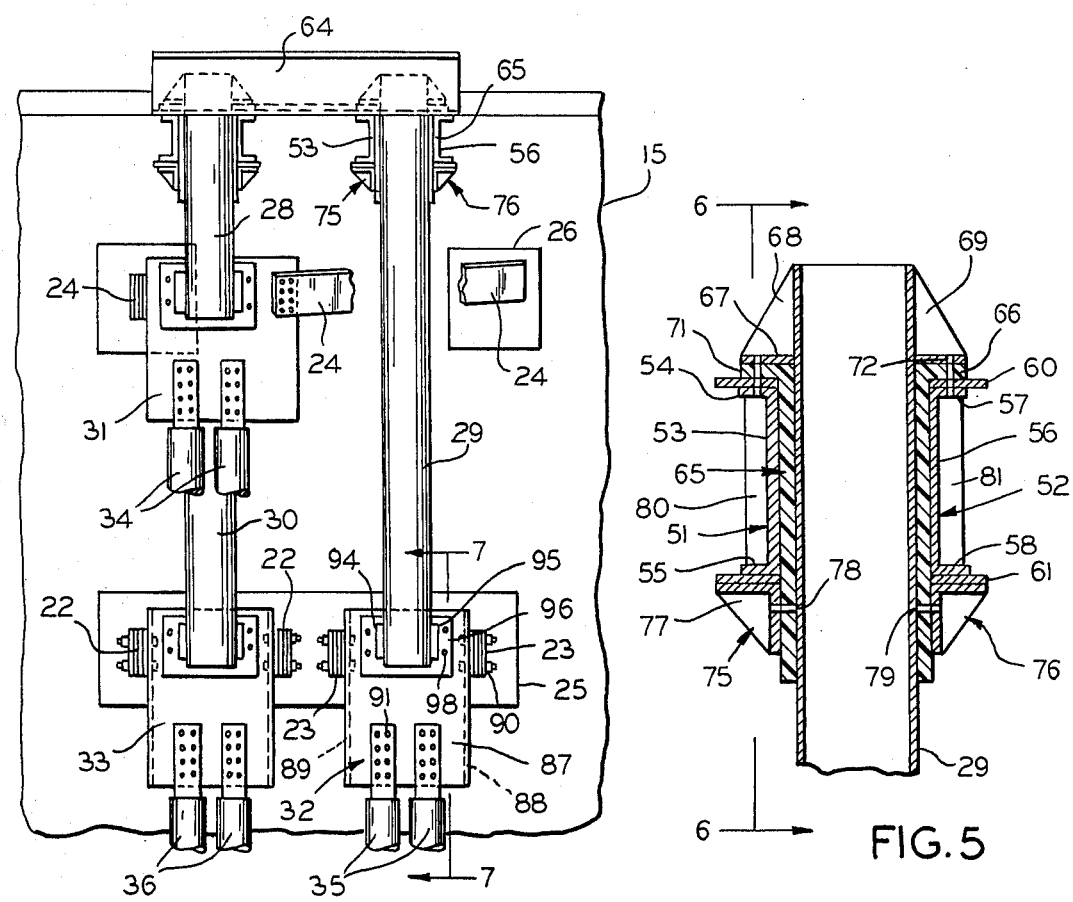
FIG.4
FIG.5
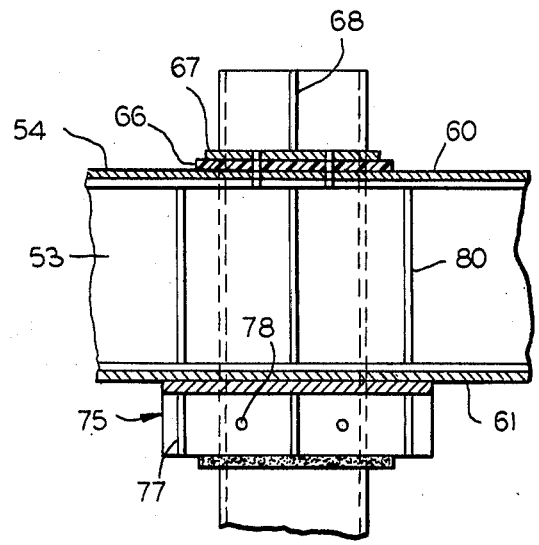
FIG.6
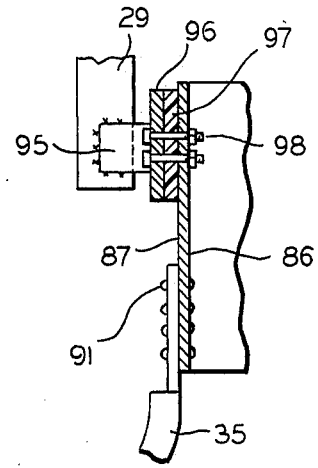
FIG.7

SUSPENSION MEANS FOR ELECTRIC FURNACE TRANSFORMER SECONDARY BUSES

BACKGROUND OF THE INVENTION

This invention relates to means for supporting the secondary buses that couple a transformer with an electric furnace.

In electric furnace installations, the high amperage supply transformer for the furnace electrodes is usually located in a room or vault so as to isolate the transformer from the furnace room. Conventional practice is to extend the heavy copper bus bars leading from the tansformer terminals through the wall of the vault and to support the bus bars from the wall. For various reasons, including assuring that forces incidental to a transformer failure will not be propagated to the furnace room and for noise isolation, the walls of the transformer room or vault are made of concrete containing steel reinforcing bars. As is known a strong magnetic field exists around the bus bars when they are conducting high current. This induces eddy currents in the reinforcing steel of the wall which results in heating of the steel and concomitant dissipation of electric power. Consequently, concrete walls for transformer vaults are often reinforced with stainless steel rods which have low magnetic susceptibility. Stainless steel reinforcing rods, however, do not have the protuberances that are ordinarily present on steel reinforcing rod. Hence, smooth stainless steel rod does not produce strong reinforcement.

Conventionally, the brackets for supporting the bus bars are supported on the wall itself. Besides the magnetic induction problems which this creates, vibratory forces incident to the flow of alternating current of rapidly changing amplitudes, are transmitted to the vault wall such that wall degradation and noise are produced.

SUMMARY OF THE INVENTION

A general object of the present invention is to reduce the above noted problems with a new bus bar suspension system.

More specific objects of this invention are to extend the bus bars from the transformer secondary in the vault through clearance openings in the wall to the furnace room so that the bus bars are not in substantial contact with the vault wall; to extend the roof beams in cantilever fashion from the upper portion of the transformer vault to outside of the vault; to avoid using the vault wall as the primary support for the cantilever beams and to support the beams independently of the wall; and, to support the bus bars remotely from the transformer by means of posts which extend downwardly from the cantilever beams to engage the ends of the bus bars.

How the foregoing and other more specific objects of the invention are achieved will appear in the course of the ensuing more detailed description of a preferred embodiment of the invention which will now be set forth in reference to the drawings.

DESCRIPTION OF THE DRAWINGS

FIG. 1 is a schematic elevation view of part of a transformer vault, the new bus supporting means and an electric furnace which is supplied from the tansformer;

FIG. 2 is a plan view of the cantilever roof beams which support the bus bars;

FIG. 3 is a side elevation of the structure in FIG. 2 as viewed in the direction of arrows 3—3 in that FIG;

FIG. 4 is an end elevation view of the structure shown in the two preceding FIGS. as viewed in the direction of the arrows 4—4 in FIG. 2;

FIG. 5 is a partial vertical section, taken on the line 5—5 in FIG. 2, of a bus support post and its associated insulators for supporting the post in an electrically isolated manner from one of the cantilever beams;

FIG. 6 is an elevation view, partly in section, taken in the direction of the arrows 6—6 in FIG. 5; and FIG. 7 is a partial section of a terminal head as viewed in the direction of the arrows 7—7 in FIG. 4.

DESCRIPTION OF A PREFERRED EMBODIMENT

The general features of the new bus suspension system and a typical use thereof will be outlined in reference to FIG. 1.

FIG. 1 shows a high power transformer 10 supported on the concrete floor 11 of a transformer room or vault which is shown in part. The room has a plurality of roof supporting beams 13 and one or more of these beams, for the purposes of the invention, has a portion 14 extending in cantilever fashion over the top of one of the walls 15 which encloses the transformer room. The roof beams are supported by a transversely extending cross beam 16 which is supported on one or more columns 17 that have a lower base 18 bearing on floor 11 or a suitable concrete pier, not shown. A fragment of one of the roof covering slabs 19 is illustrated as being supported on roof beams 13. It will be understood that the vault has roof slabs over its entirety.

Note that the roof beams 13 and roof slabs 19 derive support from cross beam 16 and its spaced apart supporting columns 17. Wall 15 may be non-load bearing and of lower strength than was heretofore necessary because it is not required to support the roof nor the bus bars leading from the transformer. The wall may be built up between columns 17 instead of being adjacent thereto as depicted in the drawing.

Mounted on the top of transformer 10 are three insulating bushings each of which has a terminal or connector 20, 21 and 22, respectively, for connecting with horizontally extending bus bars 23, 24 and 25. These bus bars may comprise a plurality of parallel flat bars of copper to provide adequate conductivity for the high currents flowing from transformer 10 as is conventional. Wall 15 is provided with openings such as 27 and 26 through which the bus bars 23-25 pass without contacting the wall.

For the illustrative three phase installation, three downwardly extending posts 28, 29 and 30 are used to support the free ends of the bus bars. The posts have lower terminal heads 31, 32 and 33, respectively, which are insulated from the posts, as will be described, and support the ends of the bus bars. Extending from terminal heads 31, 32, and 33 are, respectively, groups of flexible cables 34, 35 and 36. One group of flexible cables 34 is shown connected to an electrode clamp 43 which engages a furnace electrode 44. Clamp 43 is supported from an arm 38 which is vertically movable with a column 39 that is driven by a mechanism 40 and a motor 41. In this case furnace 45 has three electrodes 44, 46 and 47 which are typically carbon or graphite and are subject to being moved up and down in response to electric current requirements of the melt in the furnace under the influence of driven column 39. Those skilled in the art will recognize that all electrodes 44, 46 and 47 must be driven but the mechanisms for driving the latter two are omitted for the sake of brevity. The electrode support and driving means are shown schematically since they may be variously constructed in accordance with conventional practice.

The various elements of the secondary bus and cable suspension system will now be described in greater detail in reference to FIGS. 2–6.

FIG. 2 shows how the cantilever portions 14 and 14' of two of the roof beams 13 extend beyond the transformer vault wall 15. In this arrangement, as can be seen in FIG. 3, the wall 15 is built next to columns 17 and the roof beams 13 are supported on cross beam 16 which extends across the upper ends of the columns. The top margin of the wall may be built around roof beams 13 so as to abut roof slabs 19 to provide complete enclosure for the transformer.

The portions 14 and 14' of the roof beams which extend in cantilever fashion beyond the structural steel of the transformer room are constructed similarly so only one will be described. Cantilever beams 14 in this example comprise a pair of parallel channel members 51 and 52. As can be seen in FIG. 5, channel 51 has a vertically disposed web 53 and upper and lower laterally extending flanges 54 and 55, respectively. The other channel member 52 comprises a web 56 and upper and lower laterally extending flanges 57 and 58, respectively. Web 53 on channel member 51 is parallel with web 56 on channel 52. As can be seen in FIG. 2, a continuous top plate 60 spans across channel members 51 and 52. A bottom plate 61 also spans between channel members 51 and 52. Plates 60 and 61 may be welded or otherwise fastened rigidly to channel members 51 and 52 to provide a stiff box girder or beam. As can be seen in FIG. 2, the outboard ends of cantilever beams 14 and 14' are tied together and stiffened with cross beams 63 and 64 which are preferably welded to the cantilever beams.

The manner in which a typical bus support post 29 is mounted in a cantilever beam 14 will now be described. Post 29 is a stainless steel tube having a rectangular cross section in this example and is disposed between channels 51 and 52. A rigid insulating member 65 having laterally extending flanges 66 isolates the body of tubular post 29 from the channel members. The upper end of post 29 has laterally extending flanges 67 welded to it and these flanges are reinforced with stiffener ribs 68 and 69. Flanges 67 and ribs 68 and 69 are preferably made of stainless steel. The post flanges 67 bear on the top surfaces of insulator flanges 66. The upper post flanges 67, insulator flanges 66, upper continuous stiffener plate 60 and channel member flanges 54 and 57 are clamped together by insertion of bolts, not shown in FIG. 5, in clearance holes 71 and 72.

Post 29 is further supported by angle members 75 and 76 which have welded on stiffener webs such as 77. Vertical flanges of the angles 75 and 76 have clamping bolt clearance holes such as 78 and 79 which align with holes in insulator 65 and tube 29 for receiving throughbolts, not shown. Channel members 51 and 52 of the cantilever beam are further stiffened in the region of the post 29 with stiffener plates 80 and 81. Bolts which pass through metal parts and insulator 65 may have insulating sleeves, not shown, around them or clearance may be relied upon for magnetic and electrical isolation.

Buses 22, 23 and 24 coming out of transformer vault 16 through clearance openings 27 and 26 in wall 15 are joined with the stainless steel posts 28, 29 and 30 with terminal heads 31, 32 and 33, respectively. A typical terminal head 32 associated with the stainless steel post 29 will be described in reference to FIGS. 3 and 4 primarily. All of the terminal heads are conceptually the same so only one will be described. The manner in which a typical bus bar group 23 is supported from post 29 with a terminal head 32 will also be described in reference to FIGS. 4 and 7. A typical terminal head 32 as viewed in FIG. 4 is a unitary member comprising a front plate 87 and rearwardly bent sides 88 and 89. Bus sections 23 are bolted onto side plates 88 and 89 with bolts such as those marked 90. The flexible cables 35 leading to the electric furnace are also bolted onto the sides with bolts 91 as is evident from inspection of FIGS. 4 and 7. The cables could be bolted to front plate 87 if desired.

Terminal head 32 is supported from the lower end of post 29 by means including a pair of flat members 94 and 95 which are welded to the sides of post 29 and extend rearwardly thereof. The rear ends of flat members 94 and 95 are welded onto a metal plate 96 and, as can be seen in FIG. 7, there is a block 97 of rigid insulating material interposed between the bottom of plate 96 and front plate 87 of the terminal head 32. Bolts 98 which may pass through clearance holes in base plate 96, insulator 97 and front plate 87 clamp the terminal head to post 29. Insulating tubes, not shown, may be slipped over bolts 98 to provide electrical isolation or clearance between the bolts and their holes may be relied upon to provide isolation.

It is preferable for flat members 94 and 95 and base member 96 to be made of stainless steel. Terminal head 32 is preferably made of copper.

In summary, an arrangement has been described for supporting bus bars that extend substantially horizontally through holes in a transformer vault wall on posts which are suspended from cantilevered extension of the roof beams of the vault. The vault wall is not relied upon to carry vertical thrust or gravity load of the bus bard. Hence, the wall may be concrete without substantial reinforcing rod content.

Although an embodiment of the invention has been described in detail, such description is to be considered illustrative rather than limiting, for the invention may be variously embodied and is to be limited only interpretation of the claims which follow.

I claim:

1. Means for supporting a bus bar that extends from a transformer located inside of a room and through an opening in a wall of the room to the outside thereof, comprising:
    a. beam means disposed above said transformer inside of said room and having a portion extending to the outside of said room,
    b. support means for supporting said beam means with said extending portion disposed in cantilever fashion outside of said room, and
    c. bus bar support means mounted on and extending downwardly from said extending portion of said beam means for engaging and supporting a bus bar which extends from said transformer in a plane below said extending portion of said beam means.

2. Apparatus for supporting, independently of a wall of a room, bus bars which extend from inside of a transformer room to the outside thereof, comprising:

a. a beam for said room disposed in the upper region thereof and have a portion extending in cantilever fashion to the outside of said room,
b. support means for supporting said beam in said cantilever fashion independently of said wall, and
c. means mounted on the portion of said beam outside of said room for engaging and supporting a bus bar extending from said room.

3. A suspension system for bus bars that extend from a transformer inside of a room to the outside of the room for being connected with an electric furnace outside of said room, said room having at least one wall with openings therein for said bus bars to pass through, comprising:
   a. a plurality of roof beam means extending across the upper region of said room at a level above said transformer and said bus bars,
   b. support means independent of said wall, for supporting said roof beam means,
   c. predetermined ones of said roof beam means having portions extending beyond said support means to the outside of said room in cantilever fashion, and
   d. bus bar support means mounted on the outside cantilevered portion of beam means and projecting downwardly toward said bus bars for engaging and supporting said bars outside of said wall.

4. The suspension in claim 3 wherein:
   a. said bus support means comprise post means,
   b. securing means mounted on the cantilevered portion of said beam means for holding said post means and insulating means interposed between said post means and securing means,
   c. terminal means attached to said post means and engageable with said bars means, and insulating means interposed between said post means and terminal means.

5. The system set forth in claim 4 including:
   a. means for connecting electric cables to said terminal means for supplying electric power to said furnace.

6. The system set forth in claim 4 wherein said post means are comprised of stainless steel.

7. A system including bus bars for electrically connecting a transformer inside of a room with an electric furnace outside of a room, comprising:
   a. roof beams disposed across in the upper region of said room,
   b. structural members disposed at a side of said room for supporting said roof beams,
   c. wall means having bus bar passages, said wall means being adjacent said structural members,
   d. bus bar means extending generally horizontally through said passages in non-contacting relation to said wall means,
   e. certain ones of said roof beams extending in cantilever fashion beyond their supporting structural members to the outside of said room, and
   f. bus bar support means mounted on the cantilevered beams for engaging and supporting said bus bar means outside of said room.

8. The system of claim 7 wherein:
   a. said bus bar support means comprise post means extending generally downwardly from said cantilevered beams, and
   b. means for insulating said post means from said beams.

9. The system of claim 8 including:
   a. terminal head means supported on the lower ends of said post means, said bus bar means being fastened to and electrically connected to said terminal head meams, and insulating means interposed between said post means and said terminal head means.

10. The system set forth in claim 8 wherein:
    a. said post means are tubular and are comprised of stainless steel.

11. The system set forth in claim 7 wherein:
    a. said beams comprise spaced apart channel members each having vertically disposed webs and horizontally disposed upper and lower flanges, the flanges on one of said channel members extending in a direction opposite that of the other,
    b. horizontal plate means fastened, to said upper and lower flanges and bridging the space between said channel members,
    c. insulating means disposed between said channel members, said insulating means having laterally extending flanges supported on said channel member flanges, said insulating means having vertical openings formed therein.
    d. said bus bar support means comprising tubular means extending vertically through said openings said tubular means having laterally extending flange means supported on the flanges of insulating means.

12. A transformer vault having walls, an electric furnace and an electric transformer, said furnace being outside of said vault and said transformer being inside of said vault, at least one of said walls having one or more openings, a plurality of bus bars extending from said transformer through selected openings outwardly of said vault, structural members generally defining said vault and:
    a. cantilever beam means mounted on selected ones of said structural members and extending generally away from said vault and outside thereof at a level above said outwardly extending bus bars,
    b. support means mounted on said cantilever beam means outside of said vault, and
    c. means for mounting bus bars on said support means 13. The invention set forth in claim 12 including:
    a. means for insulating said support means from said cantilever beam means.

14. The invention set forth in claim 12 wherein said support means comprise:
    a. post means extending downwardly from said cantilever beam means,
    b. means for fastening said post means to said cantilever beam means, and
    c. insulating means interposed between said cantilever beam means and said post means.

15. The invention set forth in claim 12 wherein said support means comprise:
    a. terminal means supported from said support means, respectively, and
    b. means for mounting said terminal means on said bars means, said terminal means being constructed and arranged for being connected by cables for supplying electric power to said furnace.

16. The invention set forth in claim 15 including:
    a. insulating means interposed between said support means and said terminal means.

17. The invention set forth in claim 12 wherein said support means comprise post means insulatingly mounted relative to said cantilever beam means and comprised of a metal having low magnetic susceptibility.

18. The invention set forth in claim 17 wherein said metal is stainless steel.

19. The invention set forth in claim 17 wherein said post means is tubular.

20. The invention set forth in claim 19 wherein said post means is comprised of stainless steel.

21. A transformer enclosure having walls, an electric transformer disposed within said enclosure, an electric furnace disposed outside of said enclosure, at least one of said walls having one or more openings,
  a plurality of bus bars extending from said transformer through said openings outwardly of said enclosure, said enclosure including structural members,
  beam means mounted on selected ones of said structural members and extending above said transformer and having a portion extending generally outwardly of and away from said enclosure and above said bus bars,
  support means mounted on the portion of said beam means outside of said enclosure and extending downwardly thereof, and
  means for mounting said bars means on said support means.

22. The invention set forth in claim 21 wherein said support means comprise:
  unarticulated structural members affixed to said beam means,
  means for fastening said structural members to said beam means, and
  means for electrically insulating said beam means from said bus bars.

* * * * *

UNITED STATES PATENT AND TRADEMARK OFFICE
CERTIFICATE OF CORRECTION

PATENT NO. : 4,018,975
DATED : April 19, 1977
INVENTOR(S) : Girish H. Kothari

It is certified that error appears in the above-identified patent and that said Letters Patent are hereby corrected as shown below:

Claim 2, Column 5, line 2, cancel "have" and substitute
--having--.

Claim 3, Column 5, line 27, before "bars" insert --bus--.

Claim 4, Column 5, line 28, after "suspension" insert
--system--; lines 30 and 31, "portion" should be
--portions--; line 35, cancel "bars means" and
substitute --bus bars--.

Claim 15, Column 6, line 61, cancel "bars means" and substitute
--bus bars--.

Claim 21, Column 8, line 9, cancel "bars means" and substitute
--bus bars--.

Signed and Sealed this

Eleventh Day of October 1977

[SEAL]

Attest:

RUTH C. MASON
Attesting Officer

LUTRELLE F. PARKER
Acting Commissioner of Patents and Trademarks